(12) United States Patent
Yoshida et al.

(10) Patent No.: US 9,002,135 B2
(45) Date of Patent: Apr. 7, 2015

(54) FORM IMAGE MANAGEMENT SYSTEM AND FORM IMAGE MANAGEMENT METHOD

(71) Applicant: Fujitsu Limited, Kawasaki-shi (JP)

(72) Inventors: Shohei Yoshida, Fukuoka (JP); Hirofumi Kamimaru, Fukuoka (JP); Tsutomu Togo, Chigasaki (JP)

(73) Assignee: Fujitsu Limited, Kawasaki (JP)

( * ) Notice: Subject to any disclaimer, the term of this patent is extended or adjusted under 35 U.S.C. 154(b) by 167 days.

(21) Appl. No.: 13/848,554

(22) Filed: Mar. 21, 2013

(65) Prior Publication Data

US 2013/0259388 A1 Oct. 3, 2013

(30) Foreign Application Priority Data

Mar. 29, 2012 (JP) .............................. JP2012-076983

(51) Int. Cl.
*G06K 9/40* (2006.01)
*G06K 9/36* (2006.01)
*G06T 9/00* (2006.01)

(52) U.S. Cl.
CPC ........................................ *G06T 9/00* (2013.01)

(58) Field of Classification Search
None
See application file for complete search history.

(56) References Cited

U.S. PATENT DOCUMENTS

| 5,542,007 A * | 7/1996 | Chevion et al. ................ 382/232 |
| 5,815,704 A * | 9/1998 | Shimotsuji et al. ........... 358/403 |
| 7,016,536 B1 * | 3/2006 | Ling et al. ..................... 382/190 |

FOREIGN PATENT DOCUMENTS

| JP | 10-40312 A | 2/1998 |
| JP | 2000-152009 A | 5/2000 |
| JP | 2006-201965 A | 8/2006 |

* cited by examiner

*Primary Examiner* — Bhavesh Mehta
*Assistant Examiner* — David F Dunphy
(74) *Attorney, Agent, or Firm* — Fujitsu Patent Center

(57) ABSTRACT

A form image management system includes: a storage apparatus that stores a plurality of types of master images; and a computer that obtains a form image, that retrieves, from the storage apparatus, a master image having the highest correlation with the obtained form image from among the plurality of types of master images, that generates, as common-difference data, data of an image indicating a common-difference portion present in both a difference between the plurality of form images and a difference between the retrieved master image and one of the plurality of form images, that stores the common-difference data, that generates, in relation to each of the obtained form images, difference data relative to data which is the retrieved master image on which an image indicated by the common-difference data has been superimposed, and that stores the generated difference data in the storage apparatus.

16 Claims, 10 Drawing Sheets

FIG. 3

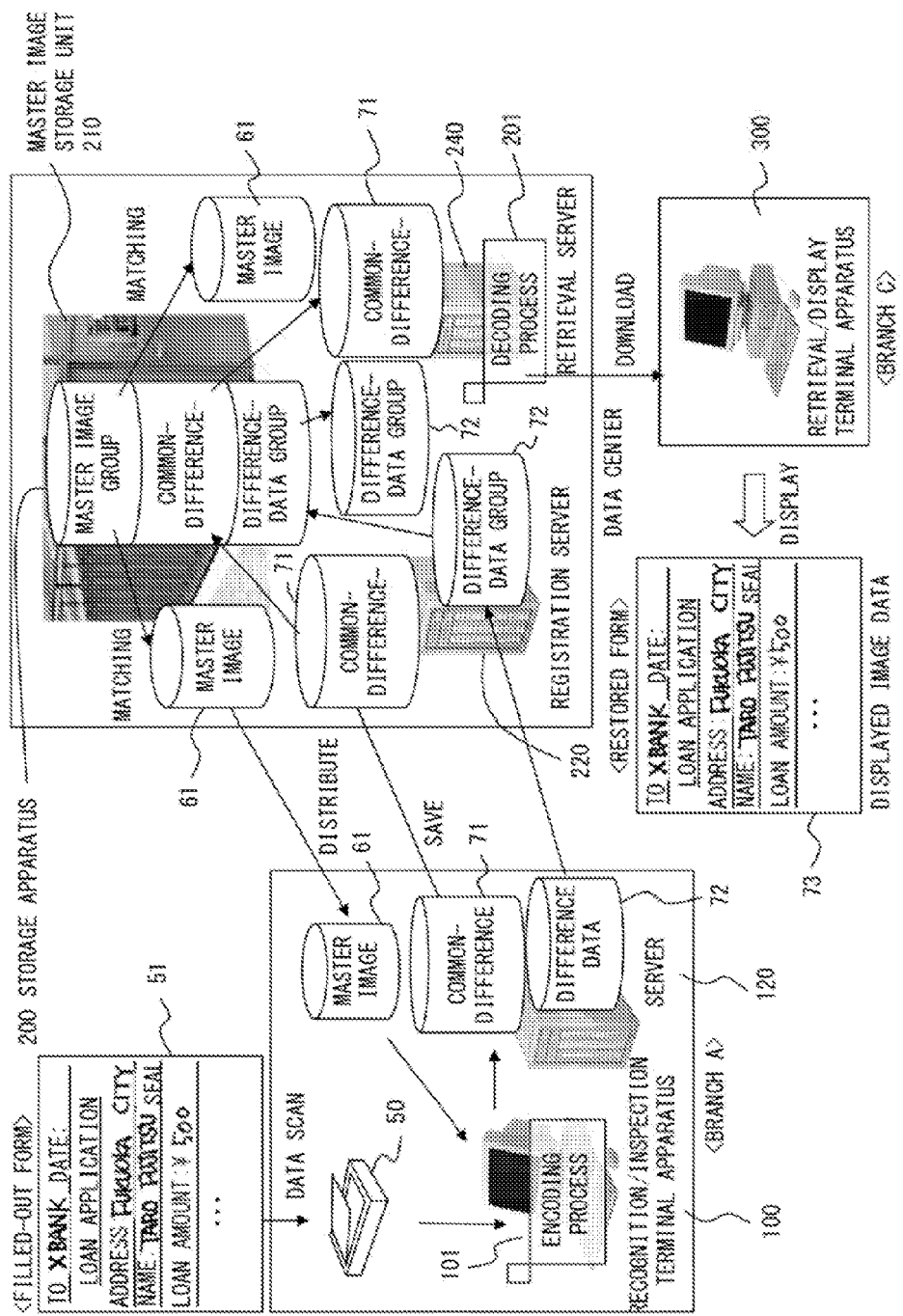
F I G. 5

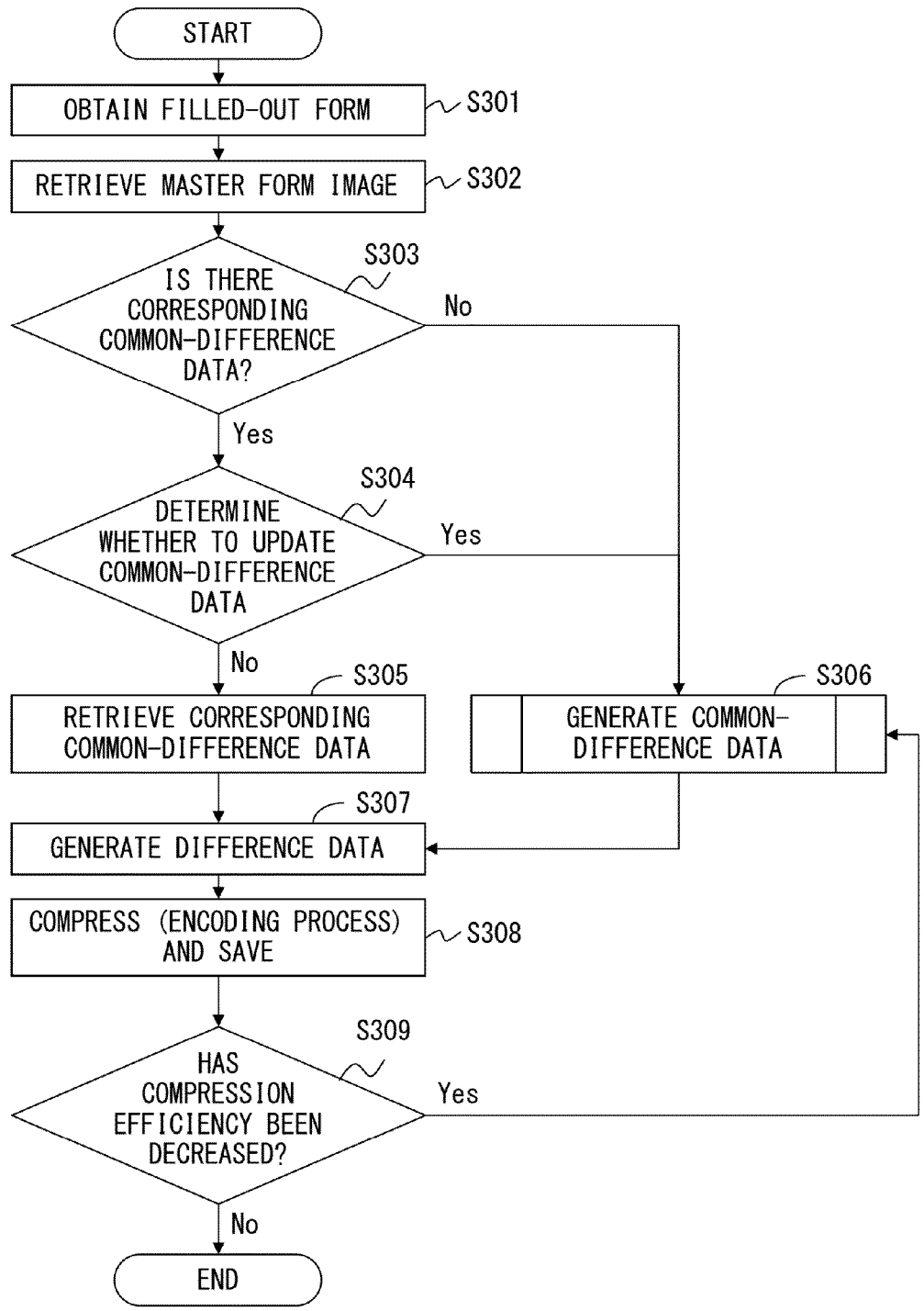
F I G. 1 0

FORM IMAGE MANAGEMENT SYSTEM AND FORM IMAGE MANAGEMENT METHOD

CROSS-REFERENCE TO RELATED APPLICATION

This application is based upon and claims the benefit of priority of the prior Japanese Patent Application No. 2012-76983, filed on Mar. 29, 2012, the entire contents of which are incorporated herein by reference.

FIELD

The aspects discussed herein are related to a form image management system and a form image management method.

BACKGROUND

In a field such as banking in which forms are handled, form management systems using a data center are used. In such systems, an electronic document is created by an image scanner apparatus reading a paper form, and the obtained form image data is preserved as evidence information. However, storage capacity for preserving form image data has been enlarged, and methods have been considered for solving such a problem.

To decrease the data amount of form image data, the form image data has been compressed using a technology of compressing a still image, e.g., JPEG (Joint Photographic Experts Group) system. However, there has been a need for storage capacity in form management systems to be considerably enlarged in recent times, and, at present, data compressibility that would be obtained by appropriating a technology of compressing a still image does not provide a sufficient countermeasure.

As an example, the following form image processing technology is known as a technology for decreasing the amount of saved data of a form image. In this technology, first, an image of a form that has been filled out is obtained. Next, an XOR operation process is performed for each pixel between the filled-out form image and an image of a blank form, thereby extracting a difference form image, which is a form image of only a written portion. Subsequently, the difference form image extracted in this way is compressed and saved. After this, in order to restore the original filled-out form image, first, the compressed difference form image that has been saved is read and a decompression process is applied to this read image so as to obtain the difference form image before compression. Next, an XOR operation process is performed for each pixel between the difference image and the blank form image above, thereby restoring the original filled-out form image. That is, in this technology, binary images are processing objects, and a form image of only a written portion, which is extracted by performing an XOR operation between image data of a blank form and image data of a filled-out form, is compressed and saved, thereby decreasing the size of saved data. This technology will hereinafter be referred to as "the first technology".

Meanwhile, the following form image creating apparatus is known as a technology of creating an image of a blank form. In the form image creating apparatus, first, a plurality of filled-out form images in the same format are obtained. Next, the filled-out form images are aligned. After the aligning, an AND image between the filled-out form images is created. Subsequently, a region surrounding a linking component of black runs (data including a queue of black data) is extracted from the created AND image and the aligned filled-out form images so as to create an image of a blank form. This technology will hereinafter be referred to as "the second technology". In the second technology, in addition, a rectangular region extracted from an AND image is associated with a rectangular region extracted from a filled-out form image, and, by using the size of the rectangular region, the number of black pixels, or the number of times a rectangular region is extracted, an unnecessary image region is specified and deleted, thereby improving the accuracy in the creating of a blank form image.

A form identifying system is known that determines whether the format of a form image read by, for example, an image scanner is the same as that of a form image that is already registered. In this system, when it is determined whether the format of a form image read by, for example, an image scanner is the same as that of an already registered form image, noise caused by, for example, writing or the imprinting of a seal is removed before identifying so as to recognize the format of the read form image. The operation of this system is divided into two modes, a registration mode and an identification mode. In the operation of the registration mode, first, registered form-image data is read and ruled line characteristics that are used for identifying are extracted. Next, some of the extracted ruled line characteristics, e.g., ruled line characteristics having a ruled line length that is shorter than a threshold, are removed as noise. In addition, so that a form obtained by additionally handwriting a section for the imprinting of a seal or another item in registered form-image data, which is called an item-added form, can be addressed, such an item-added form is also read and a designated item-added portion is registered as an allowable difference amount together with a ruled line characteristic. Meanwhile, in the operation of the identification mode, first, identified form-image data is read, and, using a method similar to the method at the time of registering, a ruled line characteristic is extracted and noise is removed. Ruled line characteristic matching is then performed on all registered form formats, and, in the matching, a format with a difference in ruled line characteristic amount that is smaller than the allowable difference amount is output as a corresponding form. When all of the registered form formats have a difference in characteristic value that is larger than the allowable difference amount, an output indicating a matching failure is made. This technology will hereinafter be referred to as "the third technology".

Patent document 1: Japanese Laid-open Patent Publication No. 2000-152009
Patent document 2: Japanese Laid-open Patent Publication No. 10-40312
Patent document 3: Japanese Laid-open Patent Publication No. 2006-201965

SUMMARY

A form image management system includes: a storage apparatus that stores a plurality of types of master images; and a computer that obtains a form image, that retrieves, from the storage apparatus, a master image having the highest correlation with the obtained form image from among the plurality of types of master images, that generates, as common-difference data, data of an image indicating a common-difference portion present in both a difference between the plurality of form images and a difference between the retrieved master image and one of the plurality of form images, that stores the common-difference data, that generates, in relation to each of the obtained form images, difference data relative to data which is the retrieved master image on which an image indicated by the common-difference data has been superimposed, and that stores the generated difference data in the storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates a method for generating difference data.

FIG. 5 illustrates an implementation of the form management system in FIG. 1.

FIG. 10 is a flowchart illustrating processing details of a second example of a form image compressing process for which a compression efficiency is considered.

DESCRIPTION OF EMBODIMENTS

Figure 1:
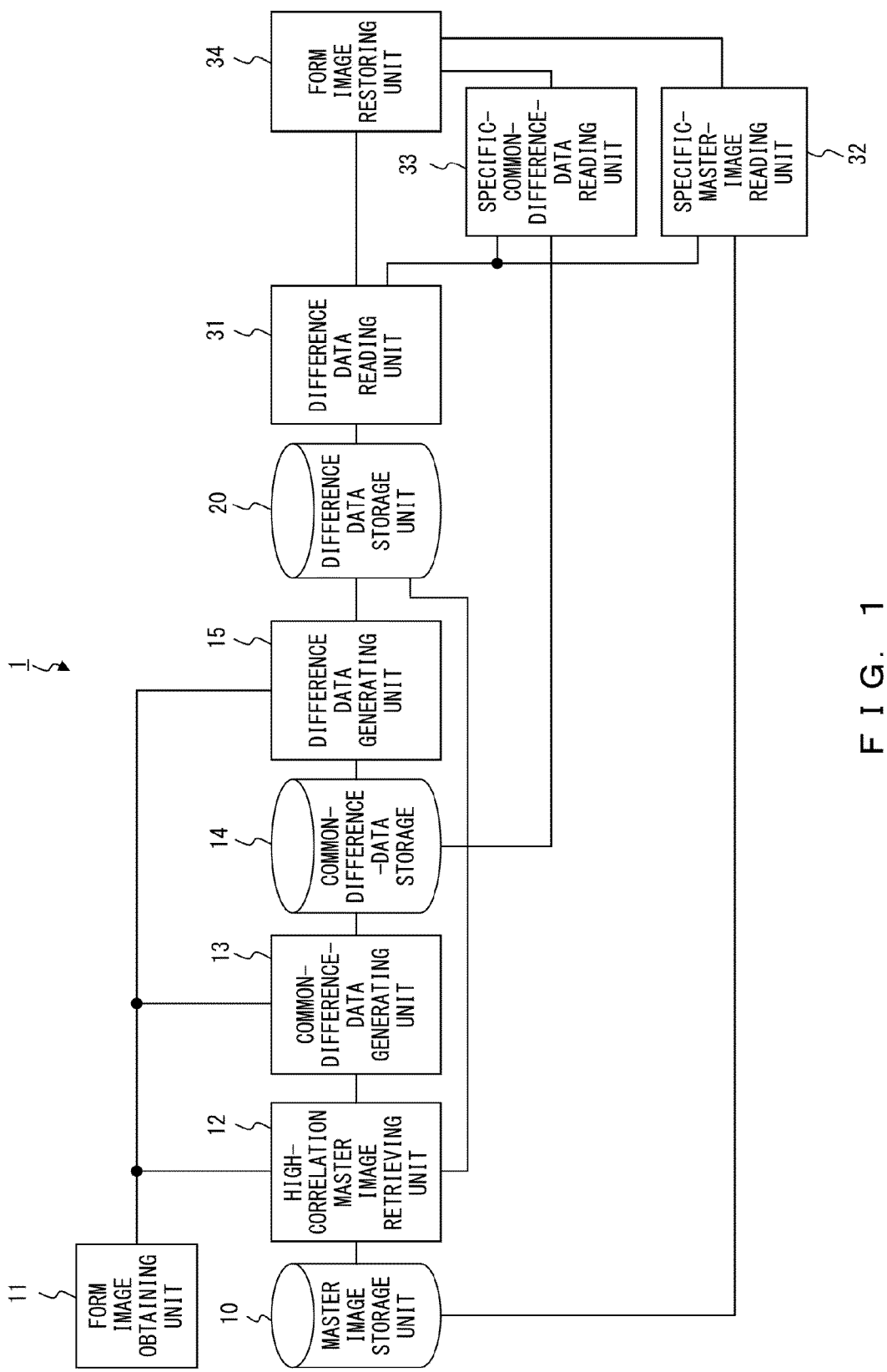
FIG. 1 is a functional block diagram of a form image management system in accordance with an embodiment.

In the first technology, data of a difference image corresponding to a difference between a filled-out form image and a blank form image is saved. However, when a filled-out form image is read using a reading apparatus such as an image scanner, noise that is generated in the reading apparatus itself is also treated as written data, so the data amount of the difference image to be saved increases. Meanwhile, reading apparatuses generate noise differently from each other, and the position and the size of noise on an obtained image are different for each individual reading apparatus.

As an example, preparing a blank form image for each reading apparatus may prevent the data amount of the difference image from increasing, but, in order to achieve this, data of many blank form images will be prepared in advance, thereby increasing the amount of the saved data.

In the managing of form image data as evidence information, it is desirable to clarify that no change has been made to form image data that is read, e.g., to clarify that the data has not been rewritten. However, applying the aforementioned process of removing noise generated in the reading apparatus itself to form image data makes it difficult to prove that no change has been made to the form image data.

Meanwhile, since the aforementioned second technology is simply a technology of generating blank forms, it is difficult to decrease the amount of saved data of filled-out form images. Moreover, even if an attempt is made to improve the accuracy in creating of a blank-form image using the second technology as described above, written information other than differences made via reading may also be removed, so it is impossible to remove the differences made via reading.

The aforementioned third technology is not capable of decreasing the data amount. Moreover, in the third technology, a ruled line characteristic, which is used to remove noise, is used to remove information not including a ruled line, so this characteristic also removes character information, and hence it is impossible to remove only the differences made via reading.

Accordingly, a form image management system is desired which decreases a data amount used for preserving form-image data used as evidence information.

In the following descriptions, reference will be properly made to the drawings, but in the drawings, like parts or parts that serve for like functions are indicated by the same or like reference signs so that overlapping descriptions can be omitted.

First, the meaning of the word "form" will be defined. In general "form" is a generic name for account books or slips used for various types of paperwork and accounting works. In the present application, however, "form" not only has the aforementioned general meaning but also means any form on which an image in a predetermined style is printed in advance and to which information is added via, for example, handwriting, imprinting of a seal, or printing, such as answer sheets for various tests and ballots for elections.

The phrase "transmit information" may hereinafter be used. The following descriptions are give on the assumption that information is exchanged using a signal, and hence, more particularly, the phrase "transmit information" means "transmit a signal including information". Signals that are used to communicate information are not limited to electrical signals but may be, for example, light.

<Overall Description of System>

FIG. 1 is a functional block diagram of a form image management system in accordance with an embodiment.

The form image management system achieves an effect of decreasing a data amount used for preserving form-image data used as evidence information.

The form image management system 1 is a system including a processor and a memory, and the form image management system 1 includes a master image storage unit 10, a form image obtaining unit 11, a high-correlation master image retrieving unit 12, a common-difference-data generating unit 13, a common-difference-data storage unit 14, a difference data generating unit 15, and a difference data storage unit 20. Their combination divides information related to a form image obtained by the form image obtaining unit 11 into a master image, common-difference data, and difference data so as to decrease the data value used for preserving the form image.

The master image storage unit 10 stores a plurality of types of master images. In the present embodiment, the master image is an image of a form on which an image in a predetermined style is printed in advance before information is added via, for example, handwriting, imprinting of a seal, or printing. A master image 400a, which will be described hereinafter, is an example of such a master image.

The form image obtaining unit 11 obtains an image of a form after adding of information via, for example, handwriting, imprinting of a seal, or printing from an image reading apparatus such as an image scanner. Filled-out form image data 500a, which will hereinafter be described, is an example of image data of such a form. In the filled-out form image data 500a, pieces of data such as an address, a name, and an amount of money are handwritten at predetermined positions on the master image 400a. These pieces of data do not need to be handwritten, but positions at which these pieces of data are written are often fixed.

The high-correlation master image retrieving unit 12 retrieves, from the master image storage unit 10, a master image having the highest correlation with a form image obtained by the form image obtaining unit 11 from among a plurality of types of master images stored in the master image storage unit 10.

The common-difference-data generating unit 13 generates common-difference data, which is image data indicating a common difference that is an image region portion common between form images obtained by the form image obtaining unit 11. The common-difference data includes a noise component generated by the reading apparatus itself.

A method for generating common-difference data performed by the common-difference-data generating unit 13 will be described with reference to FIG. 2.

Figure 2:
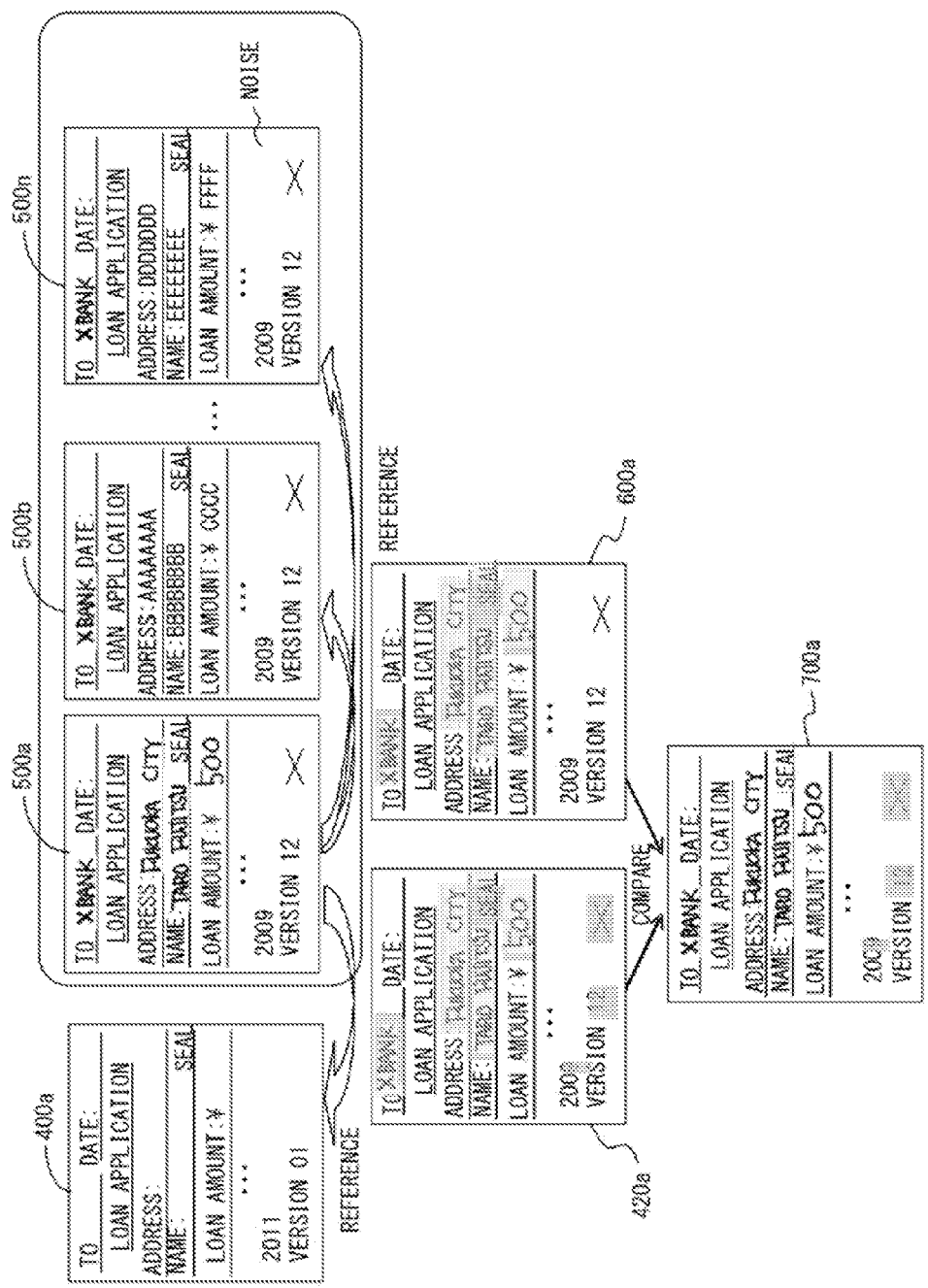
FIG. 2 illustrates a method for generating common-difference data.

FIG. 2 illustrates the master image 400*a* and filled-out form image data 500*a*, 500*b*, . . . , 500*n*.

To obtain the aforementioned common difference, firstly, the filled-out form image data 500*a*, 500*b*, . . . , 500*n* are compared with each other, and filled-out form difference data 600*a* is generated which indicates an image not including an image region portion common between the filled-out form image data 500*a*, 500*b*, . . . , 500*n*. In FIG. 2, shaded portions of the filled-out form difference data 600*a* represent regions remaining as the differences.

The filled-out form difference data 600*a* includes information added via writing, but this noise, which does not include the ruled lines of the form or noise generated by the form image obtaining unit 11 itself, is specific to each form image obtaining unit 11; accordingly, when all of the filled-out form image data 500*a*, 500*b*, . . . , 500*n* is obtained by the same form image obtaining unit 11, such noise is included commonly between all of the filled-out form image data 500*a*, 500*b*, . . . , 500*n*. Accordingly, the comparing of the filled-out form image data 500*a*, 500*b*, . . . , 500*n* with each other would not distinguish this noise from the format of the form, such as ruled lines. For this reason, this noise is not included in filled-out form common data 600*a*.

Next, the filled-out form image data 500*a*, which is one of the pieces of filled-out form image data, is compared with the master image 400*a* stored in the master image storage unit 10, and master-image difference data 420*a* is generated which indicates an image not including an image region portion that is common between the filled-out form image data 500*a* and the master image 400*a*. In FIG. 2, shaded portions of the master-image difference data 420*a* represent regions remaining as the differences.

The master-image difference data 420*a* does not include the ruled lines of the form but includes information added via writing and the aforementioned noise. The master-image difference data 420*a* is then compared with the filled-out form difference data 600*a*, and data included commonly in these pieces of data is obtained as common-difference data 700*a*. In FIG. 2, shaded portions of the common-difference data 700*a* represent regions remaining as the differences.

The common-difference data 700*a* not only includes the aforementioned noise generated by the form image obtaining unit 11 itself but also a changed portion of the form format. In the case of, for example, FIG. 2, the changed portion of the form format is the portion indicating the version of the form. That is, in FIG. 2, the master image 400*a* corresponds to "2011, version 01" and the filled-out form common data 600*a* corresponds to "2009, version 12", and hence "09" and "12" correspond to the changed portions of the form format.

The common-difference-data storage unit 14 saves the common-difference data 700*a* generated by the common-difference-data generating unit 13 as described above.

In relation to a form image obtained by the form image obtaining unit 11, the difference data generating unit 15 performs image processing for generating difference data relative to a master image retrieved by the high-correlation master image retrieving unit 12.

Figure 3:
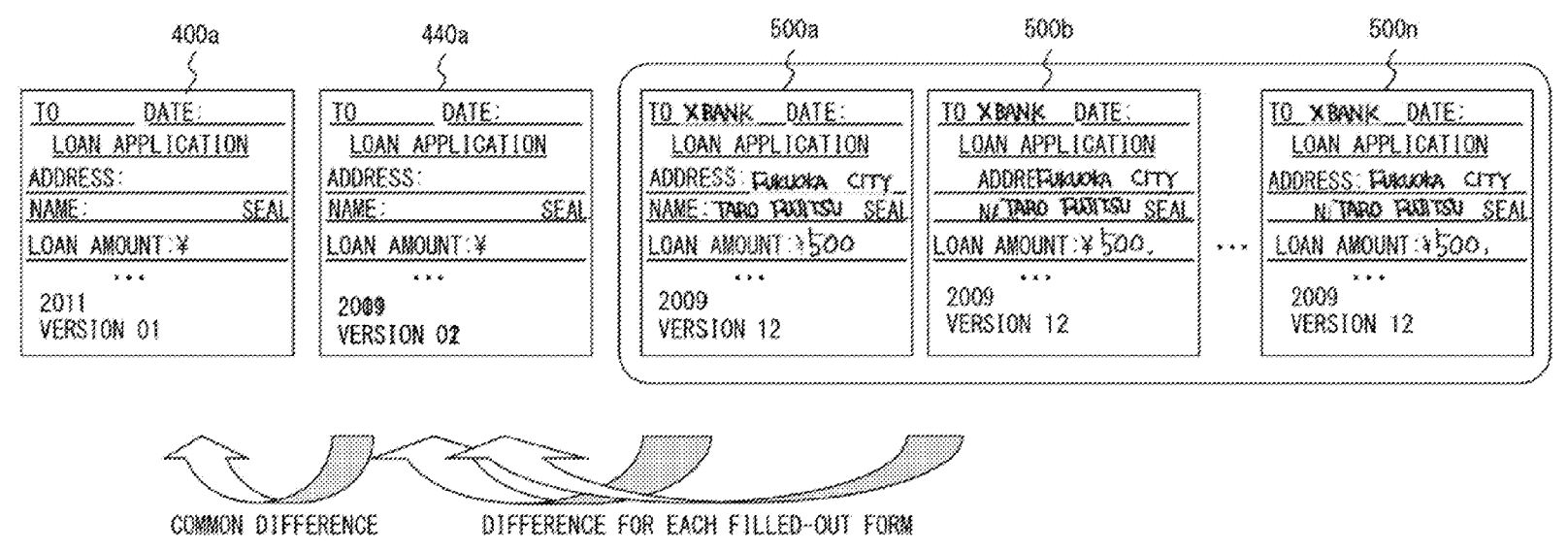

With reference to FIG. 3, descriptions will be given of a method for generating difference data which is performed by the difference data generating unit 15 using the common-difference data 700*a* generated by the common-difference-data generating unit 13.

FIG. 3 illustrates the master image 400*a*, an image 440*a* that is the master image 400*a* on which the image indicated by the common-difference data 700*a* in FIG. 2 has been superimposed, and the filled-out form image data 500*a*, 500*b*, . . . , 500*n*.

Difference data is generated by determining the difference between the image 440*a* that is the master image 400*a* on which the image indicated by the common-difference data 700*a* has been superimposed and the aforementioned filled-out form image data 500*a*, 500*b*, . . . , 500*n*. The difference data generated in this way does not include a changed portion of the form format or noise specific to the form image obtaining unit 11. In this case, the data amount is further decreased by compressing and saving only the difference data.

As an example, a video encoding technique is used as a technique to compress an image by using difference data. That is, the initial master image is encoded by an I picture (intra picture) (does not refer to a previous image), the next image, which is the master image on which a common difference has been superimposed, is defined as a P picture (predictive picture) (a picture that references the I picture), and individual filled-out form images are compressed as P pictures that reference the P picture above. In this way, a two-step reference structure is provided in such a manner that a common difference specific to the form image obtaining unit 11 is pushed into only the initial P picture, and, as a result, common-difference information is prevented from being redundantly and repeatedly encoded.

The descriptions above indicate an example in which common-difference data of only one step is provided, but common-difference information of two or more steps may be provided. As an example, in the reading of a form image, when a form with a form version that is different from the master image is used, a difference is always generated due to the difference in a form version. Under a condition in which this difference is a first common difference and a difference generated by a reading apparatus is a second common difference, the two differences, the difference due to the form version and the difference generated by the reading apparatus, may be standardized, thereby providing common-difference information of two steps.

The difference data generating unit 15 may include a function to determine whether a compression efficiency has been decreased after a data compressing process. Providing this function allows common-difference data to be updated when the compression efficiency has been decreased.

The difference data storage unit 20 stores a master image retrieved by the high-correlation master image retrieving unit 12 and difference data generated by the difference data generating unit 15.

The difference data storage unit 20 stores identification information for specifying a master image retrieved by the high-correlation master image retrieving unit 12 from among a plurality of types of master images stored in the master image storage unit 10 and stores difference data generated by the difference data generating unit 15, wherein the identification information and the difference data are associated with each other. This situation is illustrated in FIG. 4.

Figure 4:
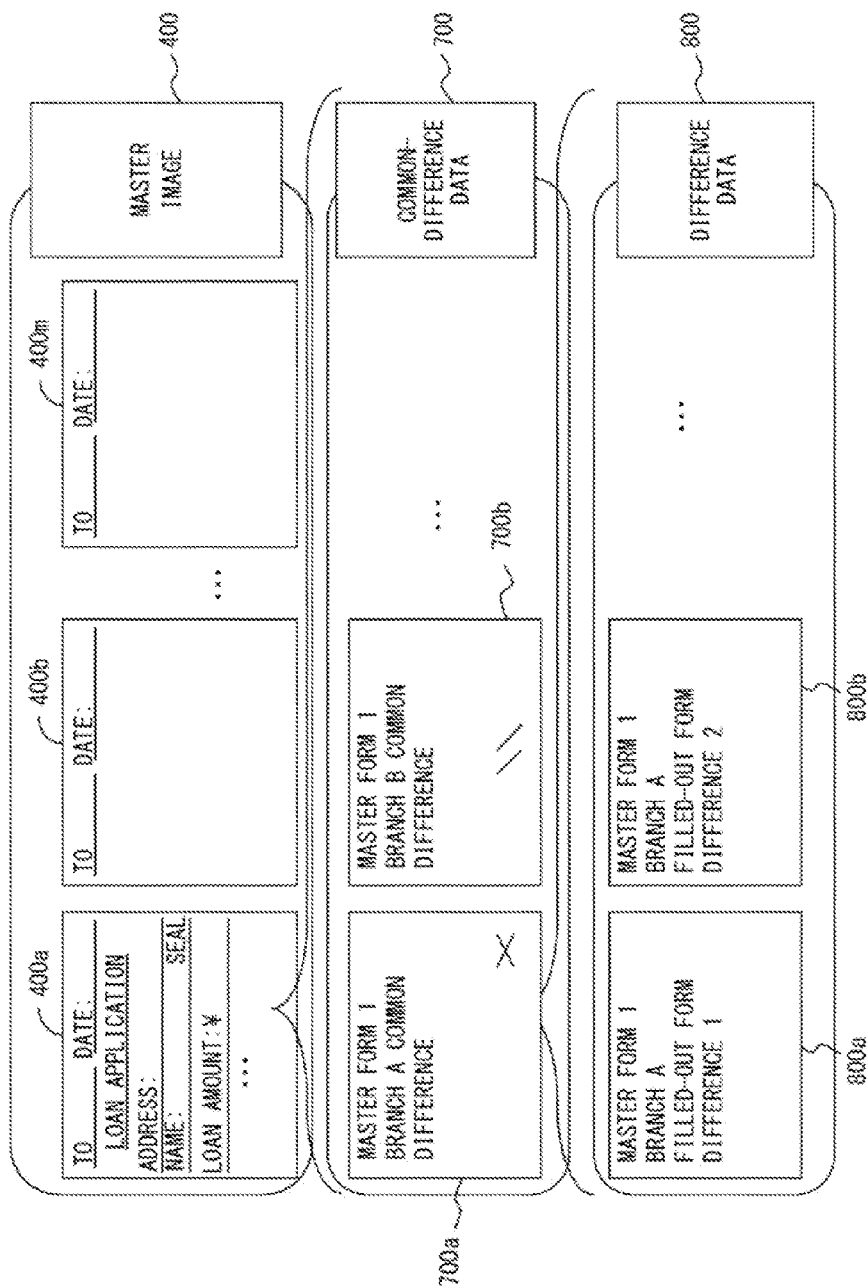
FIG. 4 is a schematic view illustrating how difference data is managed by a difference data storage unit.

FIG. 4 illustrates a situation in which a different form image obtaining unit 11 is provided for each branch. In this case, the master image 400a is associated with common differences 700a, 700b, and so on related to a plurality of form image obtaining units 11. In addition, difference data 800a, 800b, and so on related to the form image obtaining unit 11 of a certain branch are associated with each of the common differences 700a, 700b, and so on.

Each individual piece of image data of master images stored in a master image storage unit 110 may be identified by, for example, using ID (identification data) information, which is identification information for identifying each individual piece of image data. As an example, the file name of an image data file of the master image or index information associated with this file name may be used as the ID information.

As described above, in the form image management system, a master image having the highest correlation with a form image obtained by the form image obtaining unit 11 is selected from a plurality of types of master images 400a, 400b, . . . , 400m prepared in advance. In relation to the form image, difference data 800 relative to the selected master image is generated and is stored and preserved by the difference data storage unit 20. That is, in the form image management system 1, as an image for which difference data 800 is to be generated, the master image 400a, 400b, . . . , or 400m having a high correlation with a form image to be preserved is selected, and only a portion that is different from the master image 400a, 400b, . . . , or 400m is extracted as the difference data 800, thereby decreasing the amount of data to be recorded or preserved.

In the form image management system 1, according to a form image obtained by the form image obtaining unit 11, the difference data generating unit 15 may perform a motion compensation inter-frame prediction that is based on a master image retrieved by the high-correlation master image retrieving unit 12. In this case, in relation to the form image obtained by the form image obtaining unit 11, the difference data generating unit 15 generates, as difference data, information of a motion vector and information of a motion compensation inter-frame predictive error relative to the master image 400a, 400b, . . . , or 400m retrieved by the high-correlation master image retrieving unit 12. In this case, without aligning the form image obtained by the form image obtaining unit 11 with the master image 400a, 400b, . . . , or 400m as described above, the data amount of generated difference data becomes small. As a specific process, the two images above are processed in units of blocks (in units of predetermined number of blocks, e.g., in units of 4×4 pixels, 8×8 pixels, or 16×16 pixels).

In the form image management system, the difference data generating unit 15 may further apply a data compressing process to generated difference data. In this case, the difference data storage unit 20 stores the difference data to which the difference data generating unit 15 has applied the data compressing process.

The form image management system 1 in FIG. 1 may further include a master image new-storage unit that newly stores a master image in the master image storage unit 10. As an example, the master image new-storage unit newly stores, as a master image in the master image storage unit 10, a form image with difference data that is generated by the difference data generating unit 15 in relation to this form image and that has a data amount equal to or greater than a threshold from among form images obtained by the form image obtaining unit 11.

In such a situation, when the master image new-storage unit stores a new master image in the master image storage unit 10, the difference data generating unit 15 generates difference data relative to the new master image in relation to the form image obtained by the form image obtaining unit 11. Also in this case, the difference data storage unit 20 associates specification information specifying the new master image from among a plurality of types of master images stored in the master image storage unit 10 with difference data relative to the new master image generated by the difference data generating unit 15, and the difference data storage unit 20 stores this specification information and this difference data associated with each other.

In the meantime, a vector search technology may be used as a method for determining a difference between images used by the common-difference-data generating unit 13 and the difference data generating unit 15.

Vector search is used for motion compensation, a major technology of inter-frame prediction in moving image compression, and vector search is a technology of estimating the amount of movement from a reference image to a focused-on image. In this example, vector search is performed on the assumption that a reference image (a filled-out form, not a master image or a focused-on image) and a form to be filled out (a focused-on image) are two frames within a moving image. Motion search is performed for, for example, each rectangle of a 16×16 image (macro block), and, with reference to a currently processed image, a predetermined range on the reference image is searched so as to determine the most similar image position vector. As an example, a method that uses an SAD (sum of absolute difference between pixels) is known as a method for determining "the most similar image position". A small SAD indicates a great similarity to the master image, and the compression efficiency in form image compression that uses moving image compression is increased. Meanwhile, when a vector search is performed on a macro block that includes an image not included in the reference image (e.g., a written portion or noise), a similar image is not located on the reference image, and an SAD value at an optimum position determined by vector search becomes very high. That is, determining whether the SAD value is high or low allows "the most similar image position" to be determined.

Note that, instead of using an SAD in a vector search, a technique to determine a correlation with a reference image may be used.

In the meantime, as illustrated in FIG. 1, the form image management system 1 may further include a difference data reading unit 31, a specific-master-image reading unit 32, a specific-common-difference-data reading unit 33, and a form image restoring unit 34. These units are combined to restore an original form image from data stored in the difference data storage unit 20.

The difference data reading unit 31 reads, from the difference data storage unit 20 that associates and stores pieces of difference data and pieces of specification information, a piece of difference data and a piece of specification information associated with this piece of difference data.

The specific-master-image reading unit 32 reads from the master image storage unit 10 a master image specified by the specification information read by the difference data reading unit 31.

The specific-common-difference-data reading unit 33 reads from the common-difference-data storage unit 14 common-difference data used to generate the difference data that is read by the difference data reading unit 31.

The form image restoring unit 34 performs image processing for restoring a form image from the difference data read by the difference data reading unit 31, the common-difference data read by the specific-common-difference-data reading unit 33, and the master image read by the specific-master-image reading unit 32.

When, for example, the difference data generating unit 15 performs a motion compensation inter-frame prediction as described above so as to generate, as difference data, information of a motion vector and information of a motion compensation inter-frame predictive error, the form image restoring unit 34 performs the following operation.

That is, in this case, the form image restoring unit 34 first generates a predictive image using a master image read by the specific-master-image reading unit 32, common-difference data read by the specific-common-difference-data reading unit 33, and information of a motion vector included in difference data. Next, using information of a motion compensation inter-frame predictive error included in the difference data, a predictive error is added to the generated predictive image. Accordingly, the form image that has been obtained by the form image obtaining unit 11 is restored.

Although not illustrated in FIG. 1, a display unit may be connected to the form image restoring unit 34. The display unit may display a form restored by the form image restoring unit 34 to a user of the system 1.

<Implementation of Form Image Management System>

FIG. 5 illustrates an implementation of the form management system 1 in FIG. 1.

As illustrated in FIG. 5, elements of the form management system 1 are separately located at a branch A, a data center, or a branch C.

The branch A includes a scanner 50 to scan a filled-out form 51 so as to obtain information related to the filled-out form 51, a recognition/inspection terminal apparatus 100 that performs an encoding process of encoding the information related to the filled-out form 51 and obtained by the scanner 50, and an AE server 120 that stores data generated by the recognition/inspection terminal apparatus 100.

The data center includes a storage apparatus 200 to store data such as a master image, common-difference data, and difference data, a registration server 220, and a retrieval server 240. The registration server 220 and the retrieval server 240 are connected to the storage apparatus 200. The registration server 220, which is connected to the server 120 of the branch A, transfers and stores data generated by the recognition/inspection terminal apparatus 100 in the storage apparatus 200. In response to a request from outside, the retrieval server 240 retrieves data stored in the storage apparatus 200. Using a master image, common-difference data, and difference data stored in the storage apparatus 200, the retrieval server 240 performs a decoding process of decoding the original filled-out form 51.

The branch C includes a retrieval/display terminal apparatus 300. The retrieval/display terminal apparatus 300 transmits an input from a user of the retrieval/display terminal apparatus 300 to a data server, and displays the user decoded data responsively transmitted from the retrieval server 240 of the data center.

A scanner 50 forms the master image storage unit 10.

The server 120 forms the high-correlation master image retrieving unit 12, the common-difference-data generating unit 13, and the difference data generating unit 15.

The storage apparatus 200 includes functions of the master image storage unit 10, the common-difference-data storage unit 14, and the difference data storage unit 20 illustrated in FIG. 1, and stores a master image 61, common-difference data 71, and difference data 72.

The retrieval server 240 forms the difference data reading unit 31, the specific-master-image reading unit 32, the specific-common-difference-data reading unit 33, and the form image restoring unit 34.

The recognition/inspection terminal apparatus 100 compares the filled-out form 51 captured by the scanner 50 with the master image 61 included in a master image group stored in the storage apparatus 200 of the data center, thereby generating common-difference data 71 and difference data 72. The common-difference data 71 and the difference data 72 generated by the recognition/inspection terminal apparatus 100 are transmitted to the registration server 220 via the server 120. The common-difference data 71 and the difference data 72 transmitted to the registration server 220 are respectively stored as one element of a common-difference-data group and one element of a difference-data group of the storage apparatus 200.

Upon receipt of an input including a request to display a predetermined form, the retrieval/display terminal apparatus 300 of the branch C transmits the request to the retrieval server 240 of the data center. The retrieval server 240 reads a corresponding master image 61, corresponding common-difference data 71, and corresponding difference data 72 from the storage apparatus 200, performs a decoding process, and transmits the image and the data to the retrieval/display terminal apparatus 300 of the branch C.

<Configuration of Computer>

Figure 6:
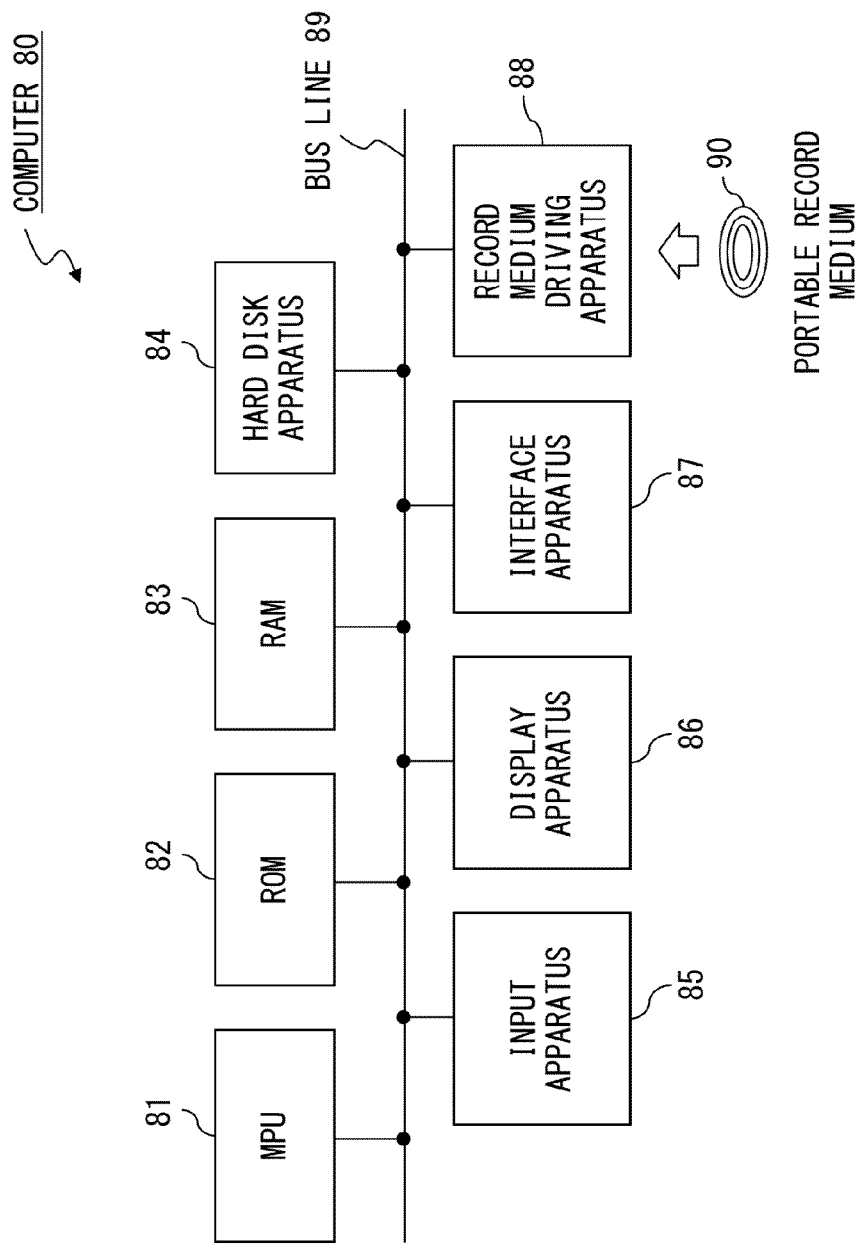
FIG. 6 is a configuration diagram of an exemplary computer usable for a form image management system.
Figure 7:
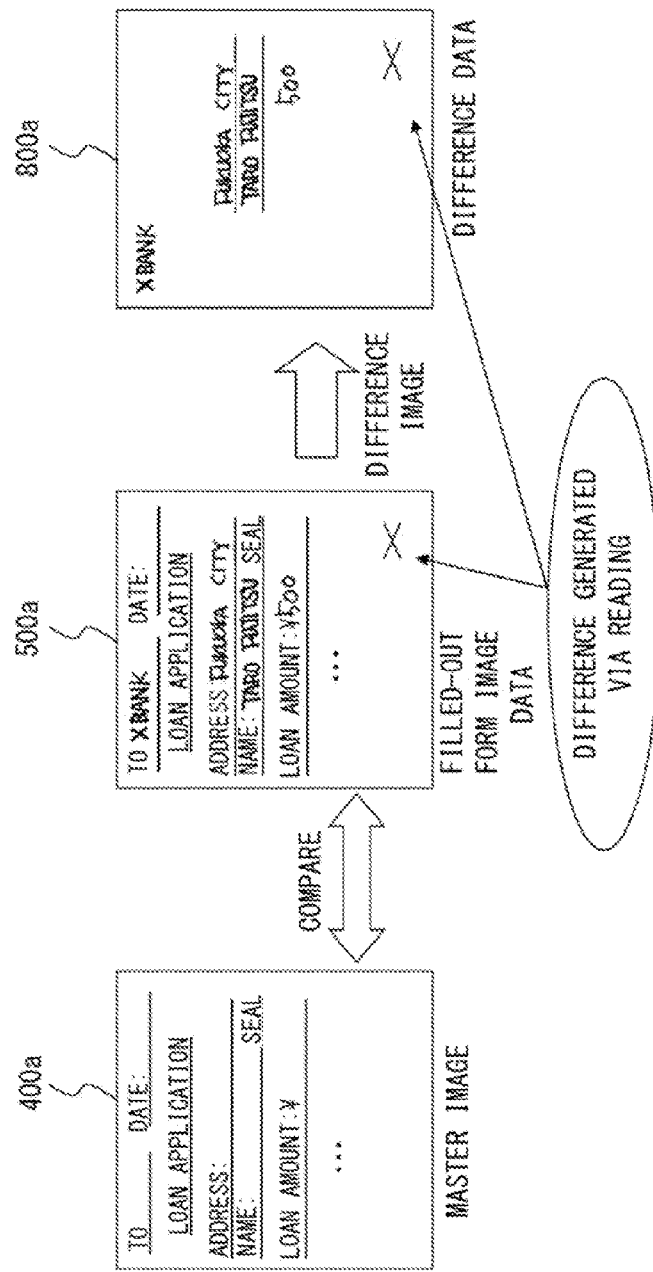
FIG. 7 is an explanatory diagram of a difference that has been read.

FIG. 6 is a configuration diagram of an exemplary computer usable for the form management system 1 in FIG. 1.

A computer 80 includes an MPU 81, a ROM 82, a RAM 83, a hard-disk apparatus 84, an input apparatus 85, a display apparatus 86, an interface apparatus 87, and a record medium driving apparatus 88. These elements are connected via a bus line 89, and, under the management of the MPU 81, various pieces of data may be transmitted between these elements.

The MPU (micro processing unit) 81 is an arithmetic processing apparatus that controls operations of the entirety of the computer 80, and the MPU 82 functions as a control processing unit of the computer 80.

The ROM (read only memory) 82 is a read-only semiconductor memory in which a predetermined basic control program is recorded in advance. During activation of the computer 80, the MPU 81 reads and executes the basic control program so that operations of each element of the computer 80 can be controlled.

The RAM (random access memory) 83 is a semiconductor memory that is capable of having data written to it or having data read from it on an as-needed basis and that may be used as a work storage region while the MPU 81 is executing various control programs.

The hard-disk apparatus 84 is a storage apparatus that stores various pieces of data and various control programs executed by the MPU 81. The MPU 81 reads and executes a predetermined control program stored by the hard-disk apparatus 84 so that various control processes, which will be described hereinafter, can be performed. As an example, when the computer 80 is used as the storage apparatus 200 in FIG. 5, the hard-disk apparatus 84 is used as the master image storage unit 10, the common-difference-data storage unit 14, and the difference data storage unit 20.

The input apparatus 85 is, for example, a mouse apparatus or a keyboard apparatus, and, when the input apparatus 85 is used by a user of the recognition/inspection terminal apparatus 100 or the retrieval/display terminal apparatus 300 illustrated in FIG. 5, the input apparatus 85 obtains an input of various pieces of information associated with the operation content and transmits the obtained input information to the MPU 81.

The display apparatus 86 is, for example, a liquid crystal display, and the display apparatus 86 displays various texts and images in accordance with display data transmitted from the MPU 81. As an example, when the computer 80 is used as the recognition/inspection terminal apparatus 100 or the retrieval/display terminal apparatus 300 illustrated in FIG. 5, a restored image of a form read by the scanner 50 which is indicated by display image data restored by the form image restoring unit 34 is displayed.

The interface apparatus 87 manages transmission and reception of various pieces of information to and from various devices connected to the computer 80. More particularly, the interface apparatus 87 manages, for example, transmission and reception of various pieces of data, such as a master image 61, common-difference data 71, and difference data 72, performed via a communication network between the scanner 50, the recognition/inspection terminal apparatus 100, the server 120, the registration server 220, the storage apparatus 200, the retrieval server 240, and the retrieval/display terminal apparatus 300 illustrated in FIG. 5. When the computer 80 is used as the server 120 in FIG. 6, the computer 80 receives and transmits to the MPU 81 scan data output from the scanner apparatus 50.

The record medium driving apparatus 88 reads various control programs and various pieces of data recorded in a portable record medium 90. The MPU 81 reads a predetermined control program recorded in the portable record medium 90 via the record medium driving apparatus 88 and executes this control program so that various control processes that will be described hereinafter can be performed. The portable record medium 90 includes a flash memory provided with a connector adapted to, for example, the USB (Universal Serial Bus) standard, a CD-ROM (compact disc read only memory), a DVD-ROM (digital versatile disc read only memory), and so on.

In order to form the recognition/inspection terminal apparatus 100, the AE server 120, the registration server 220, the storage apparatus 200, the retrieval server 240, and the retrieval/display terminal apparatus 300 by using the computer 80, a control program is created for, for example, causing the MPU 81 to perform various control processes that will be described hereinafter. The created control program is stored in the hard-disk apparatus 84 or the portable record medium 90 in advance. A predetermined instruction is then given to the MPU 81, and accordingly, the MPU 81 reads and executes the control program. In this way, the MPU 81 provides functions of the recognition/inspection terminal apparatus 100, the server 120, the registration server 220, the storage apparatus 200, the retrieval server 240, and the retrieval/display terminal apparatus 300. Accordingly, the computer 80 functions as the recognition/inspection terminal apparatus 100, the server 120, the registration server 220, the storage apparatus 200, the retrieval server 240, and the retrieval/display terminal apparatus 300.

<Comparison Between Amounts of Saved Data Favorable for a System>

In the following, effects of the form image management system 1 will be described using some comparative examples.

First, an analysis will be conducted of the amount of saved data that is preferable for the system when the first technology, which was described as a background art, is used.

Let the number of master images addressed in the system be Nm, let the number of stores that use the system be Nb, let the number of image scanners installed in the store be Ns, and let the number of filled-out forms addressed in the entire system be Ni. In addition, let an average data amount of master images be Sm1[bit/Nm], let an average of the amounts of differences between master images and filled-out form images be Si[bit/Nm], and let an average of the amounts of differences generated via reading be Sb[bit/Nm].

In this case, S1[bit], an amount of saved data that is favorable for the system, is expressed by the following formula.

$$S1 = Sm1 \times Nm + Si \times Ni \tag{1}$$

In formula (1), Sb[bit], an average value of read differences, is included in Si, and a difference of Sb×Ni is always saved as difference data. An amount of saved data S2 [bit] that is favorable for the system under a condition in which a blank-form image is prepared for each reading apparatus is expressed by the following formula, (2).

$$S2 = Sm2 \times Nm \times Nb \times Ns + Sp \times Ni \tag{2}$$

In formula (2), Sm2[bit/(Nb×Ns×Nm)] indicates an average data amount of master images. In this case, since the number of master images is prepared for each reading apparatus, the average data amount is an average of as many master images as the number of stores×the number of scanners×the number of master images. Sp[bit/Nm] indicates an average of the amounts of differences between master images and filled-out forms under a condition in which a difference is not generated by the reading apparatus.

In view of formulae (1) and (2), S1>S2 when (Si−Sp)× Ni>Nm×(Sm2×Nb×Ns−Sm1). This indicates that S1>S2 when the total amount of differences from a master image that are generated via reading is greater than the number of pieces of data that increases via a master image being prepared for each reading apparatus. Since Sm1, Sm2, Sp, and Si are average values, these values supposedly change slightly. Accordingly, under a condition in which Nm, Nb, and Ns are fixed values, as the number of filled-out forms Ni increases, the data amount S2 decreases relative to S1. In systems that address form images, since a huge number of form images are addressed, the data amount is decreased more effectively by preparing a master image for each reading apparatus. However, to achieve this, the number of master images is preferably Nb×Ns.

Here, the set values in the following table, 1, are given as the parameters in formulae (1) and (2).

TABLE 1

| Definition of Parameter | Set Value |
| --- | --- |
| Nm | 92 |
| Nb | 453 |
| Ns | 3 |
| Ni | 26,000,000 |
| Sm1[bit/Nm] | 16,789,824 |
| Sm2[bit/(Nb × Ns × Nm)] | 16,789,824 |
| Sb[bit] | 1,701,416 |
| Sp[bit] | 1,624,472 |
| Si[bit] | 2,307,536 |

Descriptions will be given of table 1.

Nm indicates the number of masters held in common by the entirety.

Nb indicates the number of stores that use the system.

Ns indicates the number of scanners installed in each store.

Ni indicates the number of forms addressed by the entire system.

Sm1[bit/Nm] indicates an average data size of one master image in the case of the entire system having the one master image.

Sm2[bit/(Nb×Ns×Nm)] is an average data size of one master image in the case of each individual scanner having a master image.

Sb[bit] indicates a difference between a master image and the master image that is read by another scanner.

Sp[bit] indicates the amount of information in the case of obtaining a difference in consideration of a difference between scanners.

Si[bit] indicates the amount of information in the case of obtaining a difference without considering a difference between scanners.

The following table, 2, indicates the amounts of saved data that are favorable for the system when the set values in table 1 are given as the parameters of formulae (1) and (2).

TABLE 2

| Amount of Saved Data Preferable for Achieve System | | Data Size |
|---|---|---|
| Scheme wherein Entire System Has One Master | S1[Gbyte] | 7,500 |
| Individual Master Scheme wherein Each Scanner Has Master | S2[Gbyte] | 5,542 |

In table 2, S1 is a scheme wherein the entire system has one master image for forms in the same format and a difference is determined between the master image and a filled-out form. S2 is a scheme wherein each scanner has a master image and a difference is determined between the master image and a filled-out form.

The set values in table 1, i.e., the number of master images Nm, the number of stores Nb, the number of scanners Ns, and the number of filled-out forms Ni, are obtained by research conducted on the assumption that the system is used by a bank. The averages of the amounts of differences generated via reading Sb[bit/Nm], the amount of difference between a master image and a filled-out form Si[bit/Nm], and the amount of difference between a master image and a filled-out form under a condition in which a difference is not generated by a reading apparatus Sp[bit/Nm] are calculated by reading a form image. The average data amounts of the master image, Sm1[bit/Nm] and Sm2[bit/(Nb×Ns×Nm)], are calculated as the same amount. The data amounts S1 and S2 are expressed using Gbytes, not bits.

Next, in relation to the form image management system 1 in FIG. 1, an amount of saved data that is favorable for achieving the system will be analyzed.

In the form image management system 1, using common-difference data, differences each generated by a particular reading apparatus are gathered into common-difference data, thereby reducing an increase in the amount of difference data. A plurality of master images do not need to be saved for each reading apparatus. A master image, common-difference data, and difference data are associated with each other, and a form image is restored using the master image and the common-difference data, both of which were used when the difference data was generated.

Here, in the form image management system 1, an attempt is made to calculate an amount of saved data that is favorable for the system.

Let the number of master images addressed in the form image management system 1 be Nm, let the number of stores that use the system be Nb, let the number of image scanners installed in the store be Ns, and let the number of filled-out forms addressed in the entire system be Ni. In addition, let an average data amount of master images be Sm1[bit/Nm], let an average of the amounts of differences between master images and filled-out form images be Si[bit/Nm], let an average of the amounts of common differences generated via reading be Sb[bit/Nm], and let an average of the amounts of differences between blank forms and filled-out forms obtained for each reading apparatus be Sp[bit/Nm], and then, S3[bit], which is the amount of saved data that is favorable for the system, is expressed by the following formula.

$$S3 = Sm1 \times Nm + Sb \times Nm \times Nb \times Ns + Sp \times Ni \quad (3)$$

S3 in formula (3) is compared with S2 in formula (2) as follows.

$$S2 - S3 = Nm(Sm2 \times Nb \times Ns - Sm1) - Sb \times Nm \times Nb \times Ns \quad (4)$$

When Nm×(Sm2×Nb×Ns−Sm1)−Sb×Nm×Nb×Ns>0, S2>S3. This indicates that S2>S3 when a data amount that increases by preparing a master image for each reading apparatus is larger than the amount of a difference generated for each reading apparatus. Since Sb is the amount of a difference generated for each reading apparatus, Sb is smaller than the data amount of a master image. Accordingly, S2>S3 when the number of master images Nm, the number of stores that use the system Nb, and the number of image scanners installed in the store Ns are large.

S1 in formula (1) is compared with S3 in formula (3) as follows.

$$S1 - S3 = Ni(Si - Sp) - Sb \times Nm \times Nb \times Ns \quad (5)$$

The data amount of S3 is small when Ni×(Si−Sp)−Sb×Nm×Nb×Ns>0. That is, S1>S3 when the total amount of differences generated via reading is greater than common-difference data. The data amount of S3 is smaller than S1 when Ni is sufficiently large. There will be a huge number of filled-out forms Ni when form images are addressed, so the data amount that is favorable for the system will be decreased.

Table 3 illustrates results of calculation of the amount of saved data that is favorable for the system when the parameters of table 1 are assigned to formula (3), in combination with the table 2 above.

TABLE 3

| Amount of Saved Data Preferable for Achieve System | | Data Size |
|---|---|---|
| Scheme wherein Entire System Has One Master | S1[Gbyte] | 7,500 |
| Individual Master Scheme wherein Each Scanner Has Master | S2[Gbyte] | 5,542 |
| Scheme of this example | S3[Gbyte] | 5,306 |
| Ratio between Scheme wherein Entire System Has One Master (S1) and Scheme of this example (S3) [%] | | 70.8% |
| Ratio between Individual Master Scheme (S2) and Scheme of this example (S3) [%] | | 95.7% |

S3 is the scheme of the form image management system 1 in FIG. 1, i.e., a scheme wherein the entire system has one master image for forms of the same format and differences made via a difference between scanners and so on are standardized so as to determine a difference between a master image and a filled-out form.

The data amount S3 is represented using Gbytes as with S1 and S2 in table 2. As indicated above, assigning the parameters in table 1 makes the data amount of the form image management system 1 in FIG. 1 smaller than the data amount in the prior arts.

The parameters in table 1 supposedly change in accordance with operation scenes. Accordingly, under a condition in which the parameters have been changed, table 4 indicates the amounts of change in the amounts of differences of the scheme of the form image management system 1 in FIG. 1 (S3 in formula (3)) and the amounts of change in the amounts of differences of the aforementioned conventional schemes (S1 in formula (1) and S2 in formula (2)).

TABLE 4

| | Amount of Change | |
|---|---|---|
| Changed Parameter | S1-S3 | S2-S3 |
| Nm | — (Sb × Nb × Ns) | Nb × Ns (Sm − Sb) − Sm |
| Nb | — (Sb × Nm × Ns) | Nm × Ns (Sm − Sb) |
| Ns | — (Sb × Nm × Nb) | Nm × Nb (Sm − Sb) |
| Ni | Si − Sp | No Change |
| Sm1 | No Change | — |
| Sm2 | — | Nm(Nb × Ns − 1) |
| Sb | — (Nm × Nb × Ns) | — (Nm × Nb × Ns) |
| Sp | —Ni | No Change |
| Si | Ni | No Change |

Here, in the comparing of S2 and S3 by changing Sm2, the data amount of one master image is different since Sm1 is different from Sm2, so the calculation is based on the assumption of Sm1=Sm2=Sm. Moreover, for the scheme of the form image management system 1 in FIG. 1, Si−Sp>0 and Sb≠0 since this scheme is considered in connection with a situation in which a difference is generated via reading.

Referring to table 4, "S1−S3" decreases in accordance with an increase in the number of master images Nm, the number of stores Nb, or the number of scanners Ns and increases in accordance with an increase in the number of addressed forms Ni. Here, Ni is considered to be greatly increased by increasing Nm, Nb, or Ns. Accordingly, the scheme of the form image management system 1 in FIG. 1 achieves a greater compression effect than the conventional scheme S1, a system in which many forms are addressed.

"S2−S3" increases as Sb, which is the amount of a common difference generated via reading, becomes smaller in comparison with Sm, which is the data amount of a master image, and "S2−S3" decreases as Sb becomes larger in comparison with Sm. As the amount of a common difference Sb becomes smaller, the compression effect of the scheme of the form image management system 1 in FIG. 1 becomes greater in comparison with the conventional scheme S2. In addition, it is unlikely that the amount of a common difference will become larger than the data amount of a master image, and hence the compression effect of the scheme of the form image management system 1 in FIG. 1 will always be greater than that of S2.

As described above, a favorable amount of saved data of the form image management system 1 of this example is only 70.8% relative to the conventional scheme wherein a difference generated via reading is not considered (the scheme of S1). Moreover, a favorable amount of saved data of the form image management system 1 of this example is only 95.7% relative to the conventional scheme wherein each image scanner has a master image so as to avoid generation of a difference via reading (the scheme of S2). Accordingly, in the form image management system 1 of this example, the capacity of a storage apparatus may be decreased. Moreover, the form image management system 1 of this example may complete the transmitting of saved form data via a network in a shorter time.

For reference, S1−S3, which is a reduction of the amount of saved data relative to the conventional scheme that is obtained by substituting the set values in table 1 in formula (5), that is achieved by the form image management system 1 in FIG. 1, and that is favorable for the system, is −2193.367 [Gbyte].

S2−S3, which is a reduction of the amount of saved data relative to the conventional scheme that is obtained by substituting the set values in table 1 in formula (4), that is achieved by the form image management system 1 in FIG. 1, and that is favorable for the system, is −235.616 [Gbyte].

<Flow of processes> Next, with reference to FIG. 8, FIG. 9, and FIG. 10, a flow of processes performed by a processor in the form image management system 1 will be described.

Figure 8:
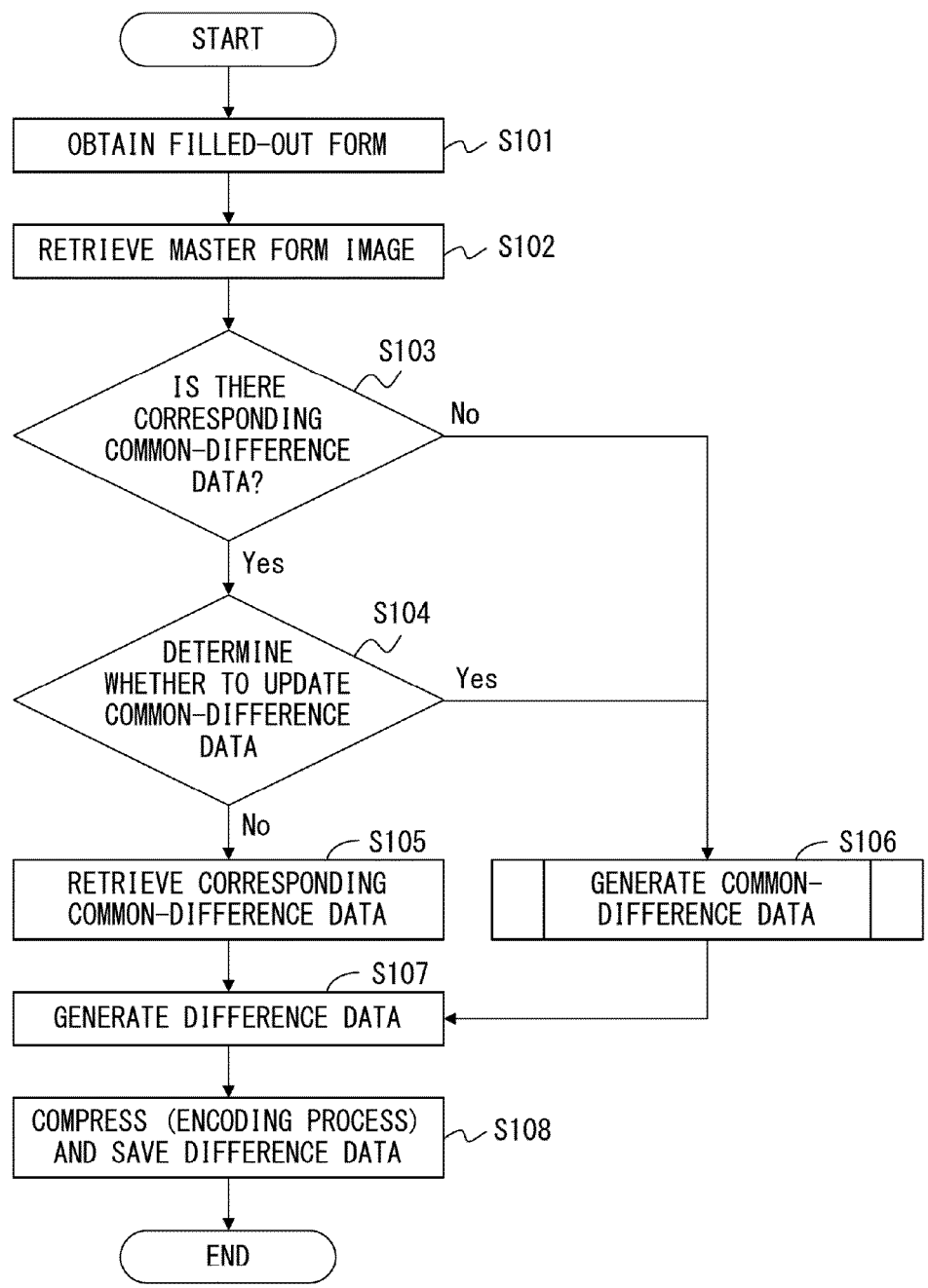
FIG. 8 is a flowchart illustrating processing details of a first example of a form image compressing process.

FIG. 8 is a flowchart illustrating processing details of a first example of a form image compressing process performed in the form image management system 1.

First, in S101, the form image obtaining unit 11 performs a process of obtaining a filled-out form image.

Next, in S102, the high-correlation master image retrieving unit 12 performs a process of retrieving a master image. As described above, the high-correlation master image retrieving unit 12 retrieves from the master image storage unit 10 a master image with the highest correlation with a form image obtained by the form image obtaining unit 11 from among a plurality of types of master images stored in the master image storage unit 10.

In S103, the common-difference-data generating unit 13 performs a process of determining whether common-difference data has already been determined in relation to the filled-out form image obtained by the form image obtaining unit 11. When the common-difference-data generating unit 13 determines that a form image of the same format as the obtained filled-out form was compressed before, i.e., when a judgment of "Yes" is indicated in S103, the common-difference-data generating unit shifts the process to S104. Meanwhile, when the common-difference-data generating unit 13 determines that a form image of the same format as the filled-out form as already obtained has never been compressed, i.e., when a judgment of "No" is indicated in S103, the common-difference-data generating unit 13 shifts the process to S106.

In S104, the common-difference-data generating unit 13 performs a process of determining whether to update common difference data.

When common-difference data is already present in relation to the filled-out form image obtained by the form image obtaining unit 11, common-difference data does not need to be newly generated. However, even though common-difference data is already present, the common-difference data may change due to the influence of, for example, stains or dirt on the apparatus. Accordingly, in S104, the process of determining whether to update the common-difference data is performed.

When a judgment of "No" is indicated in S104, i.e., when it is determined that the common-difference data does not need to be updated, the common-difference-data generating unit 13 decides to use already generated common-difference data and shifts the process to S105. Meanwhile, when a judgment of "Yes" is indicated in S104, i.e., when the common-difference-data generating unit 13 determines that already generated common-difference data is not present, or when the common-difference-data generating unit 13 determines that common-difference data needs to be updated, the common-difference-data generating unit 13 shifts the process to S106. In the determining process of S104, a judgment of "Yes" may be indicated at regular intervals in order to regularly update common-difference data. In this case, as an example, the data may be annually updated at the end of each fiscal year.

In S105, the difference data generating unit 15 performs a process of retrieving the common-difference data selected in S104. The process then shifts to S107.

Meanwhile, in S106, the common-difference-data generating unit 13 performs a process of generating common-difference data. Details of the process of S106 will be described using FIG. 9.

Figure 9:
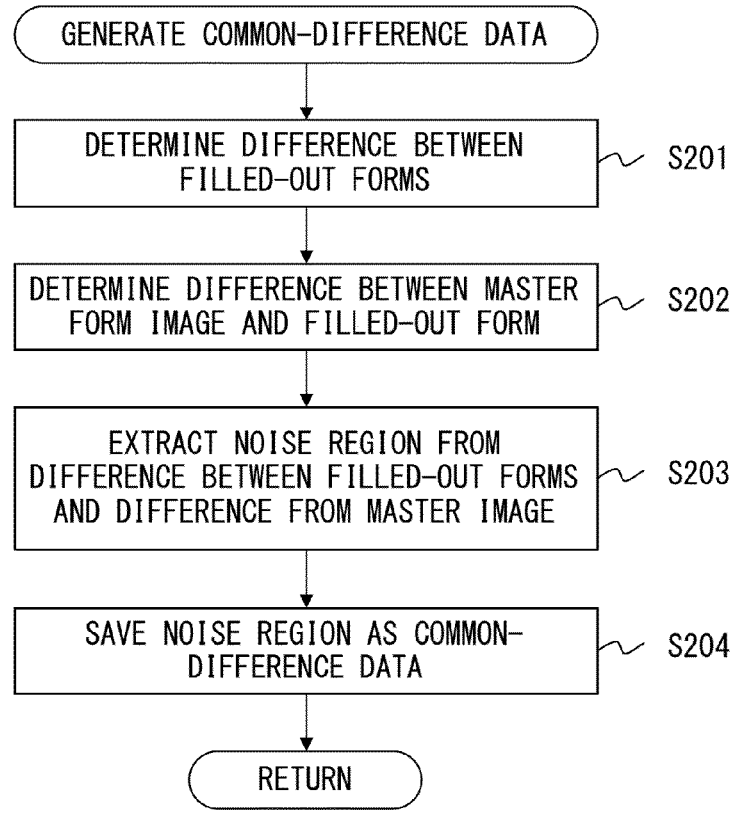
FIG. 9 is a flowchart illustrating processing details of a common-difference-data generating process.

FIG. 9 is a flowchart illustrating processing details of a common-difference-data generating process. This flowchart conforms to the method for generating common-difference data that was described using FIG. 2.

Common-difference data is generated using a plurality of pieces of filled-out-image data of the same format that have a high correlation with a master image.

First, in S201, a process is performed of determining a difference between the pieces of filled-out form image data. By determining the difference between the pieces of filled-out form image data, a scanned format portion common in the images and a common-difference portion such as noise generated by a reading apparatus are eliminated, so a written portion that is scanned only in each form image is left in association with each form image.

Next, in S202, a process is performed of determining a difference between the master image and each piece of filled-out form image data. By determining the difference between the master image and each filled-out form image, the scanned format portion common in the images is eliminated, thereby leaving the written portion associated with each form image and the common difference portion.

In S203, the difference between the filled-out form images determined in S201 is compared with the difference between the master image and each filled-out form image determined in S202 so as to extract a common-difference portion that is not present in the master image but is common to the filled-out form images.

In S204, a process is performed of saving the common-difference portion extracted in S203 in the common-difference-data storage unit 14 as common-difference data.

The process of S106 in FIG. 8 ends when the process of S204 in FIG. 9 ends. The process shifts to S107 when the process of S106 ends.

In S107, the difference data generating unit 15 performs a process of generating difference data. The difference data generating unit 15 generates the difference data by determining a difference between the filled-out form image data and the master image on which an image indicated by the common-difference data has been superimposed.

In S108, the difference data generating unit 15 performs a process of applying a compressing process (an encoding process) to the difference data generated in S107 and of saving the difference data after the compressing process in the difference data storage unit 20. After this, the process in FIG. 8 ends.

Next, FIG. 10 will be described. FIG. 10 is a flowchart illustrating processing details of a second example of the form image compressing process performed in the form image management system 1. In the process of the second example, common-difference data is updated when it is determined that a compression efficiency of the compressing of a form image has been decreased.

Processes performed in S301 to S308 in FIG. 10 are similar to those performed in S101 to S108 in the flowchart of FIG. 8.

First, in S301, the form image obtaining unit 11 performs a process of obtaining a filled-out form image.

Next, in S302, the high-correlation master image retrieving unit 12 performs a process of retrieving a master image.

In S303, the common-difference-data generating unit 13 performs a process of determining whether common-difference data has already been determined in relation to the filled-out form image obtained by the form image obtaining unit 11. When the common-difference-data generating unit 13 determines that a form image of the same format as the obtained filled-out form was compressed before, i.e., when a judgment of "Yes" is indicated in S303, the common-difference-data generating unit shifts the process to S304. Meanwhile, when the common-difference-data generating unit 13 determines that a form image of the same format as the filled-out form as already obtained has never been compressed, i.e., when a judgment of "No" is indicated in S303, the common-difference-data generating unit 13 shifts the process to S306.

In S304, the common-difference-data generating unit 13 performs a process of determining whether to update common difference data. In this case, when a judgment of "No" is indicated in S304, i.e., when it is determined that the common-difference data is not to be updated, the common-difference-data generating unit 13 decides to use already generated common-difference data and shifts the process to S305. Meanwhile, when a judgment of "Yes" is indicated in S304, i.e., when already generated common-difference data is not present, or when the common-difference-data generating unit 13 determines that common-difference data is to be updated, the common-difference-data generating unit 13 shifts the process to S306. In the determining process of S304, a judgment of "Yes" may be indicated at regular intervals in order to regularly update common-difference data. In this case, as an example, the data may be annually updated at the end of each fiscal year.

In S305, the difference data generating unit 15 performs a process of retrieving the common-difference data selected in S304. The process then shifts to S307.

Meanwhile, in S306, the common-difference-data generating unit 13 performs a process of generating common-difference data. Details of the process of S306 are the same as those described using FIG. 9.

The process of S306 in FIG. 10 ends when the processes of S201 to S204 in FIG. 9 end. The process shifts to S307 when the process of S306 ends.

In S307, the difference data generating unit 15 performs a process of generating difference data.

In S308, the difference data generating unit 15 performs a process of applying a compressing process (an encoding process) to the difference data generated in S307 and of saving the difference data after the compressing process in the difference data storage unit 20.

Afterward, in S309, the difference data generating unit 15 performs a process of determining whether the compression efficiency has been decreased. When a judgment of "Yes" is indicated, i.e., when the difference data generating unit 15 determines that the compression efficiency has been decreased, the difference data generating unit 15 returns the process to S306. Meanwhile, when a judgment of "No" is indicated, i.e., when the difference data generating unit 15 determines that the compression efficiency has not been decreased, the process in FIG. 10 ends.

As an example, in a method for judging a decrease in the compression efficiency, a threshold is set for the compression efficiency, and, when the compression efficiency exceeds the threshold, the process returns to S306 to generate common-difference data. That is, under a condition in which 5% is set as the threshold, when the compression efficiency is decreased by 5% or greater, the process returns to S306 to regenerate common-difference data. In this case, difference data is generated again in S306 using the newly generated common-difference data, and an encoding process is performed in S307.

Next, descriptions will be given of a process of restoring display image data 73 that represents a form image designated by a user of the retrieval/display terminal apparatus 300. In particular, this process is performed as follows but is not particularly limited to the following way.

First, a process is performed of generating the same predictive image as the predictive image generated in the motion compensation inter-frame prediction process performed in the performing of the aforementioned encoding process 101 in FIG. 5. The predictive image may be generated using the master image data 61 that has been obtained and information of a motion vector included in the common-difference data and the difference data, both of which are read via the performing of the decoding process 201.

Next, a process is performed of adding, to the generated predictive image, a predictive error indicated by the information of a motion compensation inter-frame predictive error that is included in the common-difference data and the difference data both of which are read via the performing of the decoding process 201.

Through the aforementioned processes, the display image data 73 is restored. Performing the decoding process 201 provides a function that corresponds to the form image restoring unit 34 in FIG. 1.

Next, a process is performed of causing the retrieval/display terminal apparatus 300 to display an original form image indicated by the display image data 73 that is restored via the performing of the aforementioned processes. Upon completion of this process, a form-image-displaying controlling process ends.

The form-image-displaying controlling process above is performed by the MPU 81, and accordingly, the computer 80 in FIG. 6 may be operated as the retrieval/display terminal apparatus 300, data preserved in the storage apparatus 200 may be read, and an original form image indicated by this data may be displayed.

In a form image management system that includes the aforementioned components in FIG. 1, image data of a master image may be stored in the master image storage unit 10 or 210 after a data compressing process adapted to, for example, a JPEG system is applied to this image data. This saves the storage capacity of the master image storage units 10 and 210. In such a case, when the image data of the master image is read from the master image storage unit 10 or 210, a data decompression process is performed to restore the original image data.

In the aforementioned configuration of the form image management system in FIG. 5, by performing motion compensation inter-frame prediction, the encoding process 101 achieves the generation of the common-difference data 71 and the difference data 72 relative to the master image data 61 in relation to the filled-out form 51, which is scan data. To restore an original form image, the decoding process 201 generates the same predictive image as the predictive image generated in the motion compensation inter-frame prediction process performed in the encoding process 101. As a technique to perform the motion compensation inter-frame prediction, various well-known techniques may be used, and the technique is not limited to the technique described above. As an example, as a technique to perform the motion compensation inter-frame prediction, a technique used in various general-purpose video encoding schemes (e.g., H.262 standard or H.264 standard standardized by ITU-T (International Telecommunication Union Telecommunication Standardization Sector)) may be adopted.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A form image management system, comprising:
    a storage apparatus configured to store a plurality of types of master images; and
    a computer configured to
        obtain a form image,
        retrieve, from the storage apparatus, a master image having a highest correlation with the obtained form image from among the plurality of types of master images,
        generate, as common-difference data, data of an image indicating a common-difference portion present in both a difference between the plurality of form images and a difference between the retrieved master image and one of the plurality of form images,
        store the common-difference data,
        generate, in relation to each of the obtained form images, difference data relative to data which is the retrieved master image on which an image indicated by the common-difference data has been superimposed, and
        store the generated difference data in the storage apparatus.

2. The form image management system according to claim 1, wherein
    in relation to the obtained form image, the computer performs a motion compensation inter-frame prediction that is based on the retrieved master image, and
    the computer generates, as the difference data, information of a motion vector and information of a motion compensation inter-frame predictive error relative to the master image in relation to the form image.

3. The form image management system according to claim 1, wherein
    in the computer, difference data is generated and compressed via video encoding using the master image as an I picture, an image created by the master image and the common-difference data as a P picture that follows the I picture, and the plurality of form images as a subsequent P picture.

4. The form image management system according to claim 1, wherein
    the computer further applies a data compressing process to the generated difference data, and
    the difference data to which the data compressing process has been applied by the computer is stored in the storage apparatus.

5. The form image management system according to claim 4, wherein
    the computer regenerates the common-difference data in accordance with a compression efficiency of the data compressing process applied to the difference data so as to update the stored common-difference data.

6. The form image management system according to claim 1, wherein
    one or more pieces of the common-difference data that associate the generated difference data with the retrieved master image are provided for one form image.

7. The form image management system according to claim 1, wherein
the computer regularly generates the common-difference data so as to update common-difference data stored in the storage apparatus.

8. The form image management system according to claim 1, wherein
the computer further reads corresponding difference data from the storage apparatus, the retrieved particular master image from the storage apparatus, and corresponding particular common-difference data from the server, and
the computer restores the form image from the difference data that has been read, the particular common-difference data that has been read, and the particular master image that has been read.

9. A form image management method, comprising:
obtaining, by a computer, a plurality of form images from a storage apparatus;
retrieving, by the computer, a master image from the storage apparatus, the master image having a highest correlation with the obtained form image from among a plurality of types of master images;
generating and storing, by the computer, as common-difference data, data of an image indicating a common-difference portion present in both a difference between the plurality of form images and a difference between the retrieved master image and one of the plurality of form images;
generating, by the computer, in relation to each of the plurality of form images, difference data relative to data which is the retrieved master image on which an image indicated by the common-difference data has been superimposed, and storing the generated difference data in the storage apparatus.

10. A non-transitory computer-readable recording medium having stored therein a program for causing a computer to execute a process comprising:
obtaining a plurality of form images from a storage apparatus;
retrieving a master image from the storage apparatus, the master image having a highest correlation with the obtained form image from among a plurality of types of master images;
generating and storing, as common-difference data, data of an image indicating a common-difference portion present in both a difference between the plurality of form images and a difference between the retrieved master image and one of the plurality of form images; and
generating, in relation to each of the plurality of form images, difference data relative to data which is the retrieved master image on which an image indicated by the common-difference data has been superimposed, and storing the generated difference data in the storage apparatus.

11. The non-transitory computer-readable recording medium according to claim 10, wherein
the generating the difference data performs, in relation to the form image obtained by the computer, a motion compensation inter-frame prediction that is based on the retrieved master image, and generates, as the difference data, information of a motion vector and information of a motion compensation inter-frame predictive error relative to the master image in relation to the form image.

12. The non-transitory computer-readable recording medium according to claim 10, wherein
the generating the difference data further generates and compresses difference data via video encoding using the master image as an I picture, an image created by the master image and the common-difference data as a P picture that follows the I picture, and the plurality of form images as a subsequent P picture.

13. The non-transitory computer-readable recording medium according to claim 10, wherein
the generating the difference data further applies a data compressing process to the generated difference data, and
the storing the difference data further stores the difference data to which the data compressing process has been applied.

14. The non-transitory computer-readable recording medium according to claim 13, wherein
the generating the common difference regenerates the common-difference data in accordance with a compression efficiency of the data compressing process applied to the difference data by the generating the difference data so as to update the stored common-difference data.

15. The non-transitory computer-readable recording medium according to claim 10, wherein
one or more pieces of the common-difference data that associate the generated difference data with the retrieved master image are provided for one form image.

16. The non-transitory computer-readable recording medium according to claim 10, wherein
the generating the common difference further generates the common-difference data regularly so as to update the stored common-difference data.

* * * * *